Figure 1:
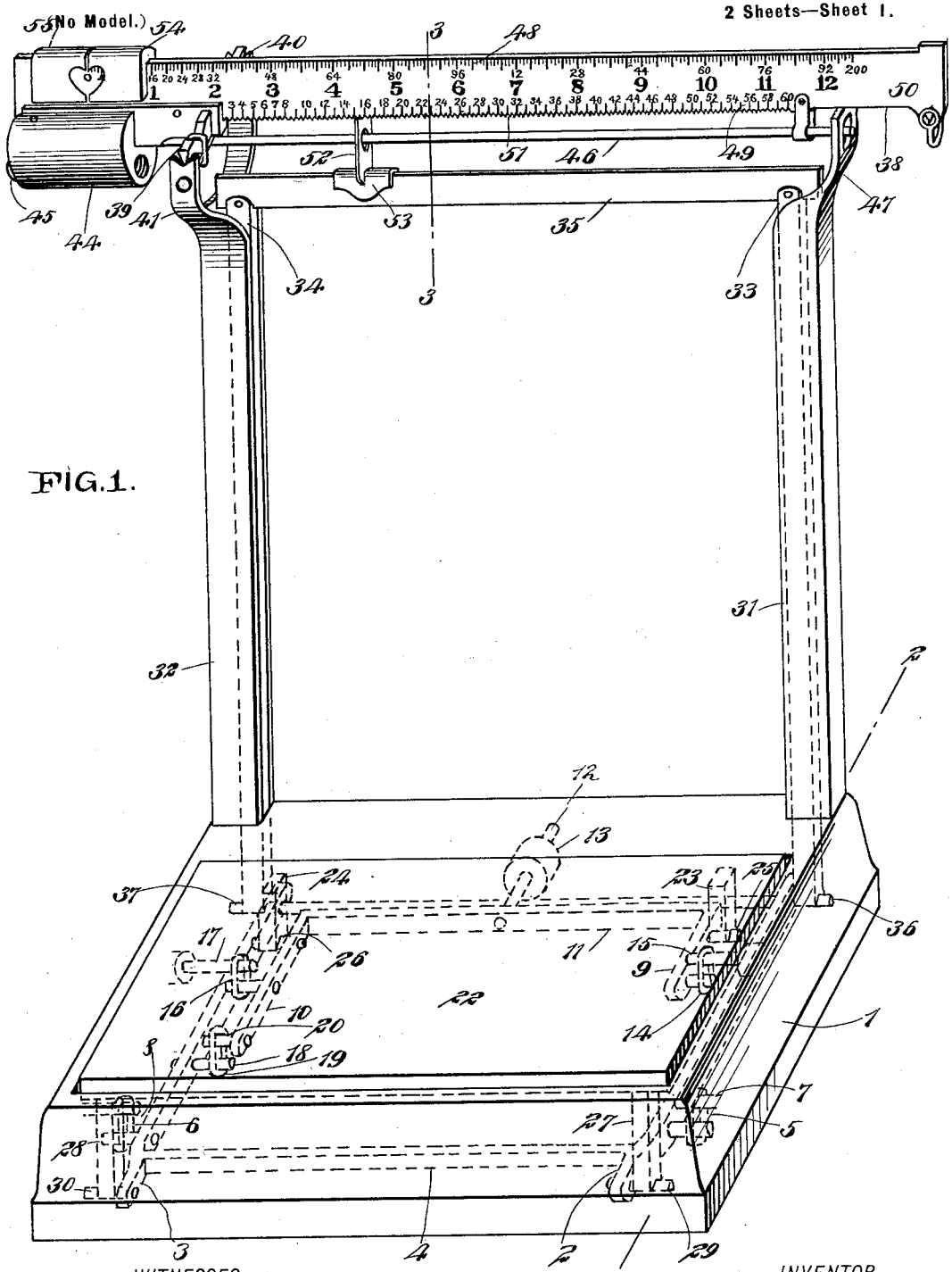

No. 656,013. Patented Aug. 14, 1900.
C. CORBIN.
WEIGHT AND PRICE SCALE.
(Application filed Dec. 11, 1899.)
(No Model.) 2 Sheets—Sheet 1.

No. 656,013. Patented Aug. 14, 1900.
C. CORBIN.
WEIGHT AND PRICE SCALE.
(Application filed Dec. 11, 1899.)
(No Model.) 2 Sheets—Sheet 2.
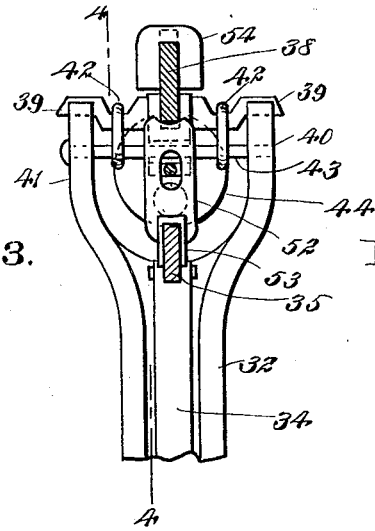
FIG.3. FIG.2.
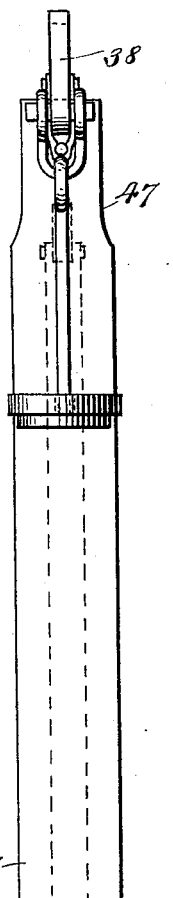
FIG.4.
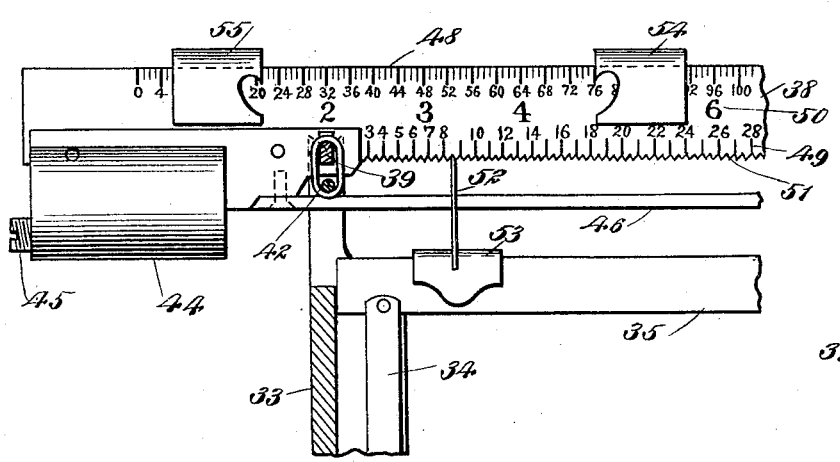
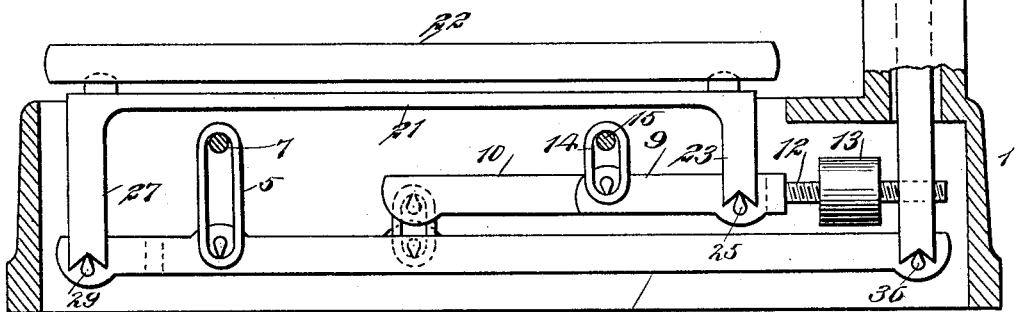
WITNESSES: INVENTOR
Donn Twitchell Clark Corbin
C. R. Ferguson BY
ATTORNEYS
THE NORRIS PETERS CO., PHOTO-LITHO., WASHINGTON, D. C.

UNITED STATES PATENT OFFICE.

CLARK CORBIN, OF CARBON CLIFF, ILLINOIS.

WEIGHT AND PRICE SCALE.

SPECIFICATION forming part of Letters Patent No. 656,013, dated August 14, 1900.

Application filed December 11, 1899. Serial No. 739,949. (No model.)

*To all whom it may concern:*

Be it known that I, CLARK CORBIN, a citizen of the United States, and a resident of Carbon Cliff, in the county of Rock Island and State of Illinois, have invented a new and Improved Weight and Price Scale, of which the following is a full, clear, and exact description.

This invention relates to improvements in scales for weighing commodities and indicating the cost thereof; and the object is to provide a scale by which the value of an article of any weight may be read (by weighing it at its price per pound) with but one line of graduations to show the value and with one line of graduations to show the price per pound.

I will describe a weight and price scale embodying my invention and then point out the novel features in the appended claims.

Reference is to be had to the accompanying drawings, forming a part of this specification, in which similar characters of reference indicate corresponding parts in all the figures.

Figure 1 is a perspective view of a scale embodying my invention. Fig. 2 is a section on the line 2 2 of Fig. 1. Fig. 3 is a section on the line 3 3 of Fig. 1, and Fig. 4 is a section on the line 4 4 of Fig. 3.

Referring to the drawings, 1 designates the box-like base of the scale, in which are weighing-levers 2 3, connected at the rear side of the base by a cross-piece 4, and they are also connected at the front end by a cross-piece. Near the rear end these levers 2 3 are fulcrumed, respectively, in links 5 6, suspended on pins 7 8, attached to the base. Supplemental levers 9 and 10 are arranged within the base and connected at the forward end by a cross-bar 11, and extended forward from this cross-bar 11 is a screw 12, on which is arranged a counterbalance-weight 13. The lever 9 is somewhat shorter than the lever 10, and it is fulcrumed near its rear end in a link 14, suspended on a pin 15, attached to the base, and the lever 10 between its ends is fulcrumed in a link 16, suspended on a pin 17, attached to the base. Extended inward from the lever 3 is a knife-edge pin 18, which has a fulcrum-bearing in a link 19, suspended from a knife-edge pin 20, attached to the rear end of the lever 10. A frame 21, on which the platform 22 is mounted, has at its forward end downwardly-extended posts 23 24, which engage with knife-edge bearings 25 26, extended, respectively, from the levers 9 and 10, and at the rear end of said frame 21 there are downwardly-extended posts 27 28, which engage, respectively, with knife-edge bearings 29 30, attached to the levers 2 and 3.
This arrangement of levers is the reverse in the manner of hanging to that of the ordinary platform-scales—that is, the platform rests on the outer ends of the several levers. Consequently a weight placed on the platform pushes up the outer ends of the levers instead of forcing them downward, as in the ordinary scale.

Extended upward from the forward end of the base and at opposite sides thereof are standards 31 and 32, and movable vertically with relation to these standards is a frame comprising uprights 33 and 34 and a top crossbar 35. These uprights extend through the standards, and at their lower ends the uprights engage with knife-edge bearings 36 37, attached to the forward ends of the levers 2 and 3. Fulcrumed on the standard 32 is a scale-beam 38. This scale-beam near its rear end is attached to a fulcrum-bar 39, which has knife-edge bearings in the divergent arms 40 41 at the upper end of the standard 32, and links 42 engage around the fulcrum-bar and also around a bolt 43, passed through the arms 40 and 41 below the fulcrum-bar. Mounted on the scale-beam rearward of its fulcrum-point is a counterbalance 44, in which is arranged an adjusting or balancing screw 45, by the moving in or out of which the balance of the beam may be adjusted. A rod 46 is attached to the scale-beam or to the counterbalance and extends forward underneath the scale-beam through an opening in an arm 47, extended upward from the standard 31. This rod by engaging with the upper wall of the opening in the arm 47 will prevent the scale-beam from moving too far upward.

The scale-beam is graduated at the top edge from "0" to "200," as indicated at 48, these graduations indicating cents, and at its lower edge the beam is provided with graduations 49, running from "3" to "60" and designed to indicate the price per pound of an article, and between these graduations 48 and 49 are pound-graduations 50. The graduations at the top represent values in cents when weighing in money, and ounces when weighing in pounds, and below "16" or the multiple thereof of the upper scale is a pound-indicating figure. The graduations on the lower edge of the beam represent the price per pound in cents and half-cents, and the lower edge of the scale is provided with notches 51, corresponding with the graduations 49. These notches are designed to receive an indicator-plate 52 for a purpose to be hereinafter described. This indicator-plate has an opening through which the rod 46 passes, and it is rigidly secured to a saddle 53, slidable on the top bar 35 of the frame. The indicator-plate 52 is held in such a position that the rod 46 does not contact with it when it is in engagement with the notches on the under side of the scale-beam. By connecting the top bar 35 of the frame with the scale-beam by means of the saddle, indicator-plate, and rod, as above described, the said frame is supported vertically and all side motion prevented.

Mounted to slide on the scale-beam are two poises 54 and 55, which when at the rear end of the beam or rearward of its fulcrum-point indicate zero, as shown in Fig. 1.

In operation I balance the scale, or rather the platform thereof, with the frame comprising the uprights 33 and 34, the cross-bar 35, and the parts 52 and 53 by turning the balance 13 on the screw 12. Then I balance the beam 38 by turning the screw 45 within the counterbalance 44. Then I connect the parts together, and the scale will be in balance with the indicator 52, placed at any price-mark. The article to be sold is to be placed on the platform 22. Then the indicator 52 is to be moved to engage with the notch underneath the figure "16" (for illustration) of the scale 49. Now move the poise 54 out until the scale balances, and the amount indicated by it on the graduation 48 will be the value of the article in cents at sixteen cents per pound and also the weight in ounces, the first figure on the graduation 50 at the left of the figure indicated on the graduation 48 being the number of pounds, and the number of marks between it and the poise being the number of ounces. To illustrate, suppose the scale poised at "76" on the graduation 48. The weight would be four pounds and three-quarters. The price-indicator 52 must be poised on "16" to weigh in pounds, it being understood that the indicator must be at "16" before correct weight in pounds and ounces can be ascertained. "16" is used to weigh pounds and ounces, because there are sixteen ounces in a pound, and of course a pound at sixteen cents would be equal in number of ounces and cents. Consequently I can use the same line of graduations and simplify my amounts on the beam, using only one line for all weights.

To weigh tare, I place the article on the platform and move the indicator 52 out to the price of the article to be sold. To illustrate better, suppose a customer asks for lard and provides a dish to receive the same. Place the dish on the platform. Then place the indicator at "8½," the price of lard per pound in cents, moving the poise 54 out until the scale balances, which may be assumed to be at "21" on the graduation 48. After placing the lard in the dish the poise 55 is to be moved out to "21" and the poise 54 is to be moved out until the scale can balance, and the figure indicated on the graduation 48 by the poise 54 will be the value of the lard, the weight of the dish being balanced by 55. If the article should be of more than two dollars in value, I attach a weight representing two dollars in value and proceed with the poises 54 and 55, as before, adding two dollars to the value indicated on the beam. If of greater value, I add slip-weights of two dollars in value each until I reach the value of the article being weighed, adding the whole amount of added weights to the value indicated on the beam. In weighing pounds I use weights representing ten pounds instead of the two-dollar weights, and they can be added until the strength limit of the scale is reached. It can be readily seen that as the indicator 52 is moved away from the fulcrum 39 it will take less power to raise the beam and the power increases in proportion as the price increases and that an article that raised the beam with indicator 52 at graduation "10" and poise 54 at graduation-mark "100" would raise it just the same if indicator were placed at "20" and poise at "200," and so on proportionately through the whole line of price-graduations.

Having thus described my invention, I claim as new and desire to secure by Letters Patent—

1. In a weight and price scale, a platform, levers on which the platform is mounted, rigidly connected in pairs, a frame comprising uprights and a top cross-bar, the uprights being supported at their lower ends by one pair of the platform-supporting levers, a scale-beam above the cross-bar of said frame, and an indicator, movable on the cross-bar of the frame and loosely connected with the scale-beam, and adapted at its end to be engaged by the lower edge of the scale-beam, substantially as described.

2. A weight and price scale, comprising a base provided with standards, a platform, levers on which the platform is supported, a frame supported on one set of the levers and having a top cross-bar, a scale-beam fulcrumed on one of the standards, an indicator loosely connected with the scale-beam, movable on the cross-bar of the said frame, and adapted at its end to be engaged by the lower edge of the scale-beam, and poises movable on the scale-beam, substantially as described.

3. A weight and price scale, comprising a base provided with standards, levers mounted on the base, a platform supported on the levers, a frame having a top cross-bar and supported at its lower end on one set of the platform-supporting levers, a scale-beam having a notched lower edge and fulcrumed on one of the standards of the base, said scale-beam having graduations representing cents and ounces, graduations representing pounds, and graduations representing prices, an indicator loosely connected with the scale-beam, movable on the cross-bar of the said frame, and adapted at its end to be engaged by the notched lower edge of the scale-beam, and poises on the scale-beam, substantially as described.

4. In a weight and price scale, a box-like base, long levers connected by cross-bars at each end and fulcrumed near their rear ends in links supported in the base, short levers of unequal length connected by a cross-bar at their forward ends and fulcrumed in links supported in the base, a link connection between the longer of said short levers and one of the first-named long levers, a platform supported at its rear end on the long levers and at its forward end on the short levers, a frame mounted on the forward ends of the long levers, a price-indicator mounted on said frame, and a scale-beam so connected with the said frame by the indicator as to limit the lateral movement of the frame, said beam being adapted to be moved by said price-indicator, substantially as specified.

5. In a weight and price scale, the combination with a platform, levers for supporting the same, and a frame supported by the platform-supporting levers, of standards, a scale-beam fulcrumed on one of the standards, a rod or bar parallel with the lower edge of the scale-beam, and an indicator slidably mounted on the cross-bar of the said frame, and provided with an opening through which the said rod loosely passes, the free end of the indicator being adapted to be engaged by the scale-beam, substantially as described.

6. In a weight and price scale, the combination with a base provided with standards, a platform, levers for supporting the platform, and a frame supported by the platform-supporting levers, of a scale-beam fulcrumed on one of the standards, a rod or bar secured to the scale-beam and extending beneath the same, the outer end of the said rod projecting into an opening in one of the standards, a saddle slidably mounted on the cross-bar of the said frame, and an indicator secured to the saddle and provided with an opening through which the said rod loosely passes, the free end of the indicator being adapted to be engaged by the scale-beam, substantially as described.

In testimony whereof I have signed my name to this specification in the presence of two subscribing witnesses.

CLARK CORBIN.

Witnesses:
SHERMAN A. CARTWRIGHT,
WILLIAM E. LOWE.